(12) United States Patent
Terada et al.

(10) Patent No.: US 7,696,274 B2
(45) Date of Patent: Apr. 13, 2010

(54) CONDUCTIVE RESIN COMPOSITION

(75) Inventors: Kazunori Terada, Sodegaura (JP); Takaaki Miyoshi, Kimitsu (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 52 days.

(21) Appl. No.: 10/593,496

(22) PCT Filed: Apr. 13, 2005

(86) PCT No.: PCT/JP2005/007162
§ 371 (c)(1), (2), (4) Date: Sep. 20, 2006

(87) PCT Pub. No.: WO2005/100478
PCT Pub. Date: Oct. 27, 2005

(65) Prior Publication Data
US 2007/0205401 A1    Sep. 6, 2007

(30) Foreign Application Priority Data
Apr. 14, 2004  (JP) ............... 2004-118708
Nov. 12, 2004  (JP) ............... 2004-328986

(51) Int. Cl.
*C08L 53/02* (2006.01)
*C08L 67/00* (2006.01)
*C08K 3/04* (2006.01)

(52) U.S. Cl. ............. 524/495; 524/496; 525/88; 525/92 B; 525/92 F; 525/397

(58) Field of Classification Search ........ 524/495, 524/496; 525/88, 92 B, 92 F, 397
See application file for complete search history.

(56) References Cited

U.S. PATENT DOCUMENTS

| 5,741,846 A | 4/1998 | Lohmeijer et al. |
| 5,843,340 A | 12/1998 | Silvi et al. |
| 5,977,240 A | 11/1999 | Lohmeijer et al. |
| 6,171,523 B1 | 1/2001 | Silvi et al. |
| 6,221,283 B1 | 4/2001 | Dharmarajan et al. |
| 6,352,654 B1 | 3/2002 | Silvi et al. |
| 6,353,050 B1 * | 3/2002 | Bastiaens et al. ............ 524/538 |
| 6,469,093 B1 | 10/2002 | Koevoets et al. |
| 6,486,255 B2 | 11/2002 | Koevoets et al. |
| 6,599,446 B1 | 7/2003 | Todt et al. |
| 7,022,776 B2 * | 4/2006 | Bastiaens et al. ............ 525/391 |
| 2002/0149006 A1 | 10/2002 | Hossan et al. |
| 2002/0183435 A1 | 12/2002 | Koevoets et al. |
| 2003/0092824 A1 | 5/2003 | Bastiaens et al. |
| 2003/0116757 A1 * | 6/2003 | Miyoshi et al. ............ 252/511 |
| 2003/0130405 A1 * | 7/2003 | Takagi et al. ............... 524/495 |
| 2003/0134963 A1 | 7/2003 | Miyoshi et al. |
| 2004/0238793 A1 * | 12/2004 | Hossan et al. ............... 252/500 |

FOREIGN PATENT DOCUMENTS

| EP | 1277807 A | 1/2003 |
| JP | 2-201811 | 8/1990 |
| JP | 6-57070 | 3/1994 |
| JP | 8-48869 | 2/1996 |
| JP | 2001-247751 | 9/2001 |
| JP | 2003-64255 | 3/2003 |
| JP | 2003-96317 | 4/2003 |
| JP | 2004-513216 | 4/2004 |
| WO | WO 99/45069 | 9/1999 |
| WO | 01/81473 | 11/2001 |
| WO | 02/33000 | 4/2002 |

OTHER PUBLICATIONS

The Chinese language Office Action mailed Oct. 31, 2008 in Corresponding Chinese Application No. 200580010975.1.
Supplementary European Search Report, mailed Jun. 4, 2008 and issued in corresponding European Patent Application No. 05730592.2-2115.

* cited by examiner

*Primary Examiner*—Jeffrey C Mullis
(74) *Attorney, Agent, or Firm*—Staas & Halsey LLP

(57) ABSTRACT

Disclosed is a conductive resin composition containing a polyamide, a polyphenylene ether, a polyester and a conductive carbon filler. The resin composition has attained excellent conductivity by being added with a small amount of the conductive carbon filler, while being excellent in fluidity and surface luster. Also disclosed is a molded body formed from such a resin composition.

12 Claims, 1 Drawing Sheet

CONDUCTIVE RESIN COMPOSITION

CROSS REFERENCE TO RELATED APPLICATIONS

This application claims the benefit of PCT International Application No. PCT/JP2005/007162 filed Apr. 13, 2005 and Japanese Application Nos. 2004-118708 and 2004-328986, filed Apr. 4, 2004 and Nov. 12, 2004 respectively in Japan, the disclosures of which are incorporated herein by reference.

TECHNICAL FIELD

The present invention relates to a resin composition excellent in conductivity, a master batch for a resin composition containing a polyamide and a polyphenylene ether, and a molded body formed from the resin composition.

BACKGROUND ART

Polyphenylene ethers are excellent not only in mechanical properties, electrical properties and heat resistance but also in dimensional stability and hence are used for various purposes. The polyphenylene ethers, however, are poor in molding processability by themselves. For improving their molding processability, a technique of blending a polyamide has been proposed and the polyphenylene ethers have become materials used for a wide variety of purposes. Conductivity has recently been imparted to polyamide-polyphenylene ether alloys, and employment of such alloys in the exterior trim parts (e.g. fender and door panels) of automobiles which can be subjected to electrostatic coating is in rapid progress.

Characteristics required of materials for the exterior trim parts of automobiles are, for example, various characteristics such as conductivity, impact strength, heat resistance and fluidity which are sufficient to conduct electrostatic coating. Regarding the levels of such characteristics required for electrostatic coating, patent document 1 (corresponding to patent document 2 and patent document 3), for example, describes that the Izod impact strength is preferably more than 15 kJ/m$^2$ and that the volume inherent resistance is preferably less than 10$^6$ Ω·cm.

With regard to a technique for imparting conductivity to a polyamide-polyphenylene ether alloy, patent document 4, for example, describes that the surface resistance can be reduced by blending carbon black. In addition, patent document 1 (corresponding to patent document 2 and patent document 3) discloses a resin composition comprising a blend of a compatibility-imparted polyamide-polyphenylene ether base resin and conductive carbon black and a production process of the resin composition. Patent document 5, patent document 6 and patent document 7 disclose resin compositions which comprise a polyphenylene ether, an impact strength improver having ethylenically unsaturated structural units, a compatibilizer, two or more polyamides and conductive carbon black or carbon fibril, and have a volume resistivity and an Izod impact resistance in specified ranges. Furthermore, patent document 8 discloses a resin composition comprising a polyphenylene ether, a polyamide, a specified amount of a compatibilizer and a specified amount of conductive carbon black or carbon fibril, and having a volume resistivity of less than 100 kΩ·cm. Patent document 9 and patent document 10 disclose resin compositions comprising a polyphenylene ether, a polyamide, talc and carbon fibril. Patent document 11 discloses a resin composition formed by adding a polyamide and carbon fibril to a first mixture comprising a polyphenylene ether, a polyamide and an impact modifier. Patent document 12 discloses a process for producing a resin composition comprising a polyamide, a polyphenylene ether and a carbon black concentrate by the use of an extruder having a L/D ratio lower than a specified value. Patent document 13 discloses, for example, a resin composition comprising a polyphenylene ether copolymer, a polyamide and a conductive filler.

Patent document 14 (corresponding to patent document 15) discloses a technique for improving conductivity by further adding organic ionic species together with a conductive filler to an organic polymer matrix. In addition, patent document 16 discloses a technique in which a carbon filler for conduction is made present in a polyphenylene ether. Patent document 17 (corresponding to patent document 18) discloses a technique in which conductive carbon black is made present in the sea phase of a resin composition having a sea-island structure formed by two thermoplastic resins, and conductive carbon black or hollow carbon fibril is made present in the island phase.

However, in these techniques, a large amount of a conductive filler such as carbon black should be blended in order to impart conductivity sufficient to conduct electrostatic coating, so that the fluidity is deteriorated. This problem has heretofore been pointed out.

Moreover, further improvement of the fluidity has come to be required with an increase in the size and shape complexity of the exterior trim parts of automobiles. Compositions obtained by conventional techniques, however, cannot easily have both a high fluidity and a high conductivity which satisfy the above requirement.

In addition, since polyamides are characterized by their water absorbability, a molded body formed from a polyamide-polyphenylene ether alloy changes in size owing to water absorption. Therefore, there has been a desire for a technique for effectively reducing the water absorption percentage and the size change caused by the water absorption.

Patent document 1: JP-A-8-48869
Patent document 2: U.S. Pat. No. 5,741,846
Patent document 3: U.S. Pat. No. 5,977,240
Patent document 4: JP-A-2-201811
Patent document 5: U.S. Pat. No. 5,843,340
Patent document 6: U.S. Pat. No. 6,171,523
Patent document 7: U.S. Pat. No. 6,352,654
Patent document 8: U.S. Pat. No. 6,221,283
Patent document 9: U.S. Pat. No. 6,469,093
Patent document 10: US-A-2002/183435
Patent document 11: U.S. Pat. No. 6,486,255
Patent document 12: US-A-2002/149006
Patent document 13: US-A-2003/92824
Patent document 14: JP-A-2004-513216
Patent document 15: U.S. Pat. No. 6,599,446
Patent document 16: WO-A-01/81473
Patent document 17: JP-A-2003-96317
Patent document 18: US-A-2003/130405

DISCLOSURE OF THE INVENTION

Problem to be Solved by the Invention

An object of the invention is to provide a composition having both a high fluidity and an excellent conductivity which cannot be attained by the above-mentioned prior arts. Another object of the invention is to provide a resin composition that has an excellent conductivity imparted by the addition of a greatly reduced amount of a conductive carbon filler and is excellent not only in fluidity but also in surface luster and low water absorption properties, and a molded article formed from such a resin composition.

Means for Solving the Problem

The present inventors earnestly investigated in order to achieve the above objects, and consequently found that a resin composition comprising a polyamide, a polyphenylene ether, a polyester and a conductive carbon filler is effective in obtaining a resin composition excellent in the above-mentioned characteristics and a molded article thereof, thereby the present invention has been accomplished. That is, the present invention relates to a resin composition comprising a polyamide, a polyphenylene ether, a polyester and a conductive carbon filler and a molded article thereof.

The constitution of the invention is as follows.

(1) A resin composition comprising a polyamide, a polyphenylene ether, a polyester and a conductive carbon filler.

(2) The resin composition according to (1), wherein the polyamide forms a continuous phase and the polyphenylene ether and the polyester form a discontinuous phase.

(3) The resin composition according to (1), wherein the polyester is one or more members selected from the group consisting of poly(ethylene terephthalate)s, poly(trimethylene terephthalate)s and poly(butylene terephthalate)s.

(4) The resin composition according to (1), wherein the amount of the polyester is 0.1 to 25 parts by mass per 100 parts by mass of the sum of the polyamide and the polyphenylene ether.

(5) The resin composition according to (4), wherein the amount of the polyester is 1 to 15 parts by mass per 100 parts by mass of the sum of the polyamide and the polyphenylene ether.

(6) The resin composition according to (1), wherein the amount of the conductive carbon filler is 0.1 to 3 parts by mass per 100 parts by mass of the sum of the polyamide, the polyphenylene ether and the polyester.

(7) The resin composition according to (1), wherein the average primary-particle diameter or average fiber diameter of the conductive carbon filler is less than 1 µm.

(8) The resin composition according to (1), wherein the conductive carbon filler is one or more members selected from the group consisting of conductive carbon black and carbon fibril.

(9) The resin composition according to (1), wherein at least a portion of the conductive carbon filler is present in the polyester phase and/or the interface between the polyester phase and the polyamide phase.

(10) The resin composition according to (1), which comprises the conductive carbon filler added in the form of a master batch obtained by previously blending the conductive carbon filler with one or more members selected from the group consisting of the polyester and the polyamide.

(11) The resin composition according to (1), wherein the polyphenylene ether is selected from the group consisting of poly(2,6-dimethyl-1,4-phenylene ether)s, copolymers of 2,6-dimethylphenol and 2,3,6-trimethylphenol, and mixtures thereof.

(12) The resin composition according to (1), which further comprises an elastomer.

(13) The resin composition according to (12), wherein the elastomer is a hydrogenated product of a block copolymer comprising at least one polymer block composed mainly of an aromatic vinyl compound and at least one polymer block composed mainly of a conjugated diene compound.

(14) A master batch for a resin composition comprising a polyamide and a polyphenylene ether, which comprises a conductive carbon filler and a polyester.

(15) The master batch according to (14), which further comprises the polyamide.

(16) An injection-molded article formed from the resin composition according to (1).

ADVANTAGES OF THE INVENTION

By blending a polyamide, a polyphenylene ether, a polyester and a conductive carbon filler, the invention can provide a resin composition that can exhibit an excellent conductivity imparted by the addition of a smaller amount of the conductive carbon filler and is excellent not only in fluidity but also in surface luster and low water absorption properties, and a molded body formed from such a resin composition.

BEST MODE FOR CARRYING OUT THE INVENTION

Figure 1:
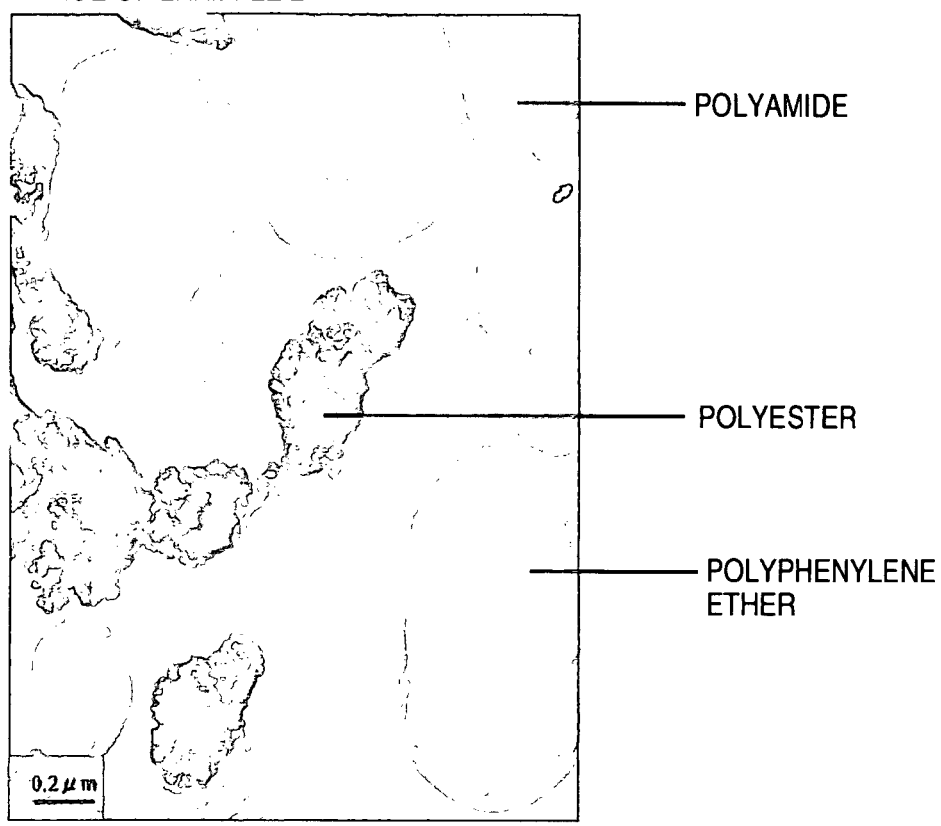
FIG. 1 represents a transmission electron microscopic image (ruthenium steam staining and phosphotungstic acid immersion staining) of the resin composition of Example 2.

The components usable in the invention are described below in detail.

As to the kind of the polyamide usable in the invention, any polyamide may be used so long as it has an amide linkage {—NH—C(=O)—} in the repeating structural unit of the polymer. Although the polyamide is generally obtained by the ring opening polymerization of a lactam, the polycondensation of a diamine with a dicarboxylic acid, the polycondensation of an aminocarboxylic acid, or the like, a method for producing the polyamide is not limited to these methods.

Examples of the above-mentioned diamine are divided broadly into aliphatic, alicyclic and aromatic diamines. Specific examples thereof are tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)cyclohexane, m-phenylenediamine, p-phenylenediamine, m-xylylenediamine, p-xylylenediamine, etc.

Examples of the dicarboxylic acid are divided broadly into aliphatic, alicyclic and aromatic dicarboxylic acids. Specific examples thereof are adipic acid, suberic acid, azelaic acid, sebacic acid, dodecanedicarboxylic acid, 1,1,3-tridecanedicarboxylic acid, 1,3-cyclohexanedicarboxylic acid, terephthalic acid, isophthalic acid, naphthalenedi-carboxylic acid, dimer acids, etc.

Specific examples of the lactam are ε-caprolactam, enantholactam, ω-laurolactam, etc.

Specific examples of the aminocarboxylic acid are ε-aminocaproic acid, 7-aminoheptanoic acid, 8-aminooctanoic acid, 9-aminononanoic acid, 11-aminoundecanoic acid, 12-aminododecanoic acid, 13-aminotridecanoic acid, etc.

In the invention, there may be used any of copolymerized polyamides obtained by polycondensation of one of or a mixture of two or more of the above-exemplified lactams, diamines, dicarboxylic acids and ω-aminocarboxylic acids. There can also be suitably used polyamides obtained by polymerizing any of the lactams, diamines, dicarboxylic acids and ω-aminocarboxylic acids to obtain a low-molecular weight oligomer in a polymerizer and making the oligomer into a high-molecular weight compound with an extruder or the like.

A polymerization method for producing the polyamide resin used in the invention is not particularly limited, and there may be employed any of melt polymerization, interfacial polymerization, solution polymerization, bulk polymerization, solid phase polymerization, and a combination thereof. Of these, the melt polymerization is preferably employed.

In particular, the following polyamides, for example, can be effectively used in the invention: polyamide 6, polyamide 6,6, polyamide 4,6, polyamide 11, polyamide 12, polyamide 6,10, polyamide 6,12, polyamide 6/6,6, polyamide 6/6,12, polyamide MXD (m-xylylenediamine),6, polyamide 6,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I, polyamide 6,6/12/6,I, etc. There can also be used polyamides obtained by making two or more polyamides into a copolymer with an extruder or the like. Preferable examples of the polyamide are polyamide 6, polyamide 6,6, polyamide 6/6,6, and mixtures thereof. The most preferable examples of the polyamide are polyamide 6, polyamide 6,6 and mixtures thereof.

The polyamide usable in the resin composition of the invention may have any viscosity number. A preferable viscosity range is such that the viscosity number ranges from 90 to 130 ml/g, more preferably 100 to 125 ml/g, as measured in 96% sulfuric acid according to ISO307.

In the invention, a mixture of polyamides different in viscosity number may be used. As the mixture, there are exemplified a mixture of a polyamide having a viscosity number of 150 ml/g and a polyamide having a viscosity number of 80 ml/g, and a mixture of a polyamide having a viscosity number of 120 ml/g and a polyamide having a viscosity number of 115 ml/g. Among mixtures of polyamides different in viscosity number, especially preferable mixtures are mixtures of polyamides each of which has a viscosity number in the range of 90 to 130 ml/g and which are different in viscosity number. The viscosity number of the mixture can be confirmed by dissolving the mixture blended with a predetermined mass ratio in 96% sulfuric acid and measuring the viscosity number according to ISO307.

The polyamide generally has an amino group and a carboxyl group as end groups. The amino group/carboxyl group equivalent ratio is preferably 9/1 to 1/9, more preferably 8/2 to 1/9, still more preferably 6/4 to 1/9.

The concentration of the terminal amino group is preferably at least $1 \times 10^5$ mol/g, more preferably not more than $4 \times 10^5$ mol/g and not less than $1 \times 10^5$ mol/g. The concentration of the terminal carboxyl group is preferably at least $9 \times 10^5$ mol/g, more preferably not more than $13 \times 10^5$ mol/g and not less than $9 \times 10^5$ mol/g.

As a method for adjusting the end groups of the polyamide resin, a method clearly known to those skilled in the art can be adopted. There is exemplified a method in which one or more compounds selected from diamine compounds, monoamine compounds, dicarboxylic acid compounds, monocarboxylic acid compounds and the like are added at the time of polymerization for the production of the polyamide resin so as to adjust the concentrations of the end groups to predetermined concentrations.

In the invention, known metallic stabilizers such as those described in JP-A-1-163262 can also be used without any problem in order to improve the thermal stability of the polyamide resin.

Of such metallic stabilizers, CuI, $CuCl_2$, copper acetate, cerium stearate and the like are particularly preferably usable. Halides of alkali metals represented by potassium iodide, potassium bromide and the like can also be suitably used. Needless to say, the above-exemplified metallic stabilizers and halides may be added in combination.

The total proportion of the metallic stabilizer(s) and/or the alkali metal halide(s) is preferably 0.001 to 1 part by mass per 100 parts by mass of the polyamide resin.

In the invention, known organic stabilizers can be used without any problem besides the above-mentioned metallic stabilizers. The organic stabilizers include, for example, hindered phenol type antioxidants represented by Irganox 1098 and the like; phosphorus-containing processing-heat stabilizers represented by Irgafos 168 and the like; lactone type processing-heat stabilizers represented by HP-136; sulfur-containing thermal stabilizers; and hindered amine type light stabilizers. Of these organic stabilizers, the hindered phenol type antioxidants, the phosphorus-containing processing-heat stabilizers, or a combination thereof is more preferable.

The proportion of the organic stabilizers is preferably 0.001 to 1 part by mass per 100 parts by mass of the polyamide resin.

In addition, besides the additives described above, known additives addable to the polyamide, and the like may also be added in an amount of less than 10 parts by mass per 100 parts by mass of the polyamide.

The polyphenylene ether usable in the invention is a homopolymer and/or a copolymer, which comprise structural units represented by the formula (1):

[Formula 1]

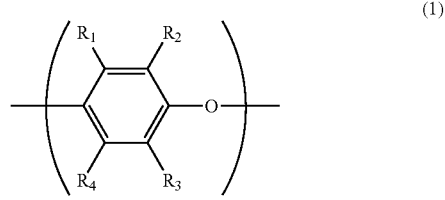

wherein O is an oxygen atom; and $R_1$ through $R_4$ are independently hydrogen, halogen, primary or secondary lower alkyl, phenyl, haloalkyl, aminoalkyl, hydrocarbon-oxy, or halohydrocarbon-oxy in which at least two carbon atoms separate the halogen atom and the oxygen atom from each other.

Specific examples of the polyphenylene ether used in the invention are poly(2,6-dimethyl-1,4-phenylene ether)s, poly (2-methyl-6-ethyl-1,4-phenylene ether)s, poly(2-methyl-6-phenyl-1,4-phenylene ether)s, poly(2,6-dichloro-1,4-phenylene ether)s, etc. In addition, as the polyphenylene ether, there are also exemplified polyphenylene ether copolymers such as copolymers of 2,6-dimethylphenol and another phenol (e.g. copolymers with 2,3,6-trimethylphenol and copolymers with 2-methyl-6-butylphenol, such as those described in JP-B-52-17880). When a copolymer of 2,6-dimethylphenol and 2,3,6-trimethylphenol is used as the polyphenylene ether, the proportions of monomer units corresponding to these components are particularly preferably as follows: the copolymer comprises about 80 to about 90% by mass of 2,6-dimethylphenol units and about 10 to about 20% by mass of 2,3,6-trimethylphenol units when the total amount of the polyphenylene ether copolymer is taken as 100% by mass.

Of the above-exemplified polyphenylene ethers, the poly (2,6-dimethyl-1,4-phenylene ether)s, the copolymers of 2,6-dimethylphenol and 2,3,6-trimethylphenol, or mixtures thereof are especially preferable.

A process for producing the polyphenylene ether used in the invention is not particularly limited so long as the polyphenylene ether can be obtained by a known method. As the process, there are exemplified the production processes described in the specification of U.S. Pat. Nos. 3,306,874, 3,306,875, 3,257,357, 3,257,358, JP-A-50-51197, JP-B-52-17880, JP-B-63-152628 and the like.

The reduced viscosity ($\eta_{sp/c}$: measured at 30° C. and a concentration of 0.5 g/dl in a chloroform solution) of the polyphenylene ether usable in the invention ranges preferably from 0.15 to 0.70 dl/g, more preferably from 0.20 to 0.60 dl/g, still more preferably from 0.40 to 0.55 dl/g.

In the invention, a blend of two or more polyphenylene ethers different in reduced viscosity may be used. There may be used, for example, a mixture of a polyphenylene ether having a reduced viscosity of 0.45 dl/g or less and a polyphenylene ether having a reduced viscosity of 0.50 dl/g or more, and a mixture of a low-molecular weight polyphenylene ether having a reduced viscosity of 0.40 dl/g or less and a polyphenylene ether having a reduced viscosity of 0.50 dl/g or more. Needless to say, the blend is not limited to them.

In addition, the polyphenylene ether usable in the invention may be a wholly or partly modified polyphenylene ether. The term "modified polyphenylene ether" used here means a polyphenylene ether modified with at least one modifying compound having in its molecular structure at least one carbon-carbon double or triple bond and a functional group(s) of at least one kind selected from the group consisting of carboxylic acid groups, acid anhydride groups, amino group, hydroxyl group and glycidyl group.

As a process for producing the modified polyphenylene ether, there are exemplified (1) a process in which polyphenylene ether is reacted with the modifying compound in the presence or absence of a free-radical initiator at a temperature in the range of lower than the glass transition temperature of the polyphenylene ether and not lower than 100° C. without melting the polyphenylene ether; (2) a process in which polyphenylene ether is reacted with the modifying compound by melt kneading in the presence or absence of a free-radical initiator at a temperature in the range of not higher than 360° C. and not lower than the glass transition temperature of the polyphenylene ether; and (3) a process in which polyphenylene ether is reacted with the modifying compound in a solution in the presence or absence of a free-radical initiator at a temperature lower than the glass transition temperature of the polyphenylene ether. Although any of these processes may be adopted, the processes (1) and (2) are preferable.

The at least one modifying compound having in its molecular structure at least one carbon-carbon double or triple bond and a functional group(s) of at least one kind selected from the group consisting of carboxylic acid groups, acid anhydride groups, amino group, hydroxyl group and glycidyl group is specifically explained below.

As a modifying compound having in the molecule a carbon-carbon double bond and a carboxylic acid group or an acid anhydride group at the same time, there are exemplified maleic acid, fumaric acid, chloromaleic acid, cis-4-cyclohexene-1,2-dicarboxylic acid, and acid anhydrides thereof. In particular, fumaric acid, maleic acid and maleic anhydride are preferable, and fumaric acid and maleic anhydride are especially preferable. There can also be used compounds obtained by converting one or two of the carboxyl groups of such an unsaturated dicarboxylic acid to an ester.

As a modifying compound having in the molecule a carbon-carbon double bond and a glycidyl group at the same time, there are exemplified allyl glycidyl ether, glycidyl acrylate, glycidyl methacrylate and epoxidized natural oils. Of these, glycidyl acrylate and glycidyl methacrylate are especially preferable.

As a modifying compound having in the molecule a carbon-carbon double bond and a hydroxyl group at the same time, there are exemplified allyl alcohol, 4-penten-1-ol, unsaturated alcohols of the general formula $C_nH_{2n-3}OH$ (n is a positive integer) such as 1,4-pentadien-3-ol, and unsaturated alcohols of the general formulas $C_nH_{2n-5}OH$ and $C_nH_{2n-7}OH$ (n is a positive integer).

The above-exemplified modifying compounds may be used alone or in combination.

The amount of the modifying compound added in the production of the modified polyphenylene ether is preferably 0.1 to 10 parts by mass, more preferably 0.3 to 5 parts by mass, per 100 parts by mass of polyphenylene ether. When the modified polyphenylene ether is produced by the use of a free-radical initiator, the amount of the free-radical initiator is preferably 0.001 to 1 part by mass per 100 parts by mass of polyphenylene ether. The percentage of addition of the modifying compound in the modified polyphenylene ether is preferably 0.01 to 5% by mass, more preferably 0.1 to 3% by mass. Unreacted modifying compound and/or a polymer of the modifying compound may remain in the modified polyphenylene ether.

For stabilizing the polyphenylene ether, various known stabilizers can be suitably used. The stabilizers include, for example, metallic stabilizers such as zinc oxide, zinc sulfide, etc.; and organic stabilizers such as hindered phenol type stabilizers, phosphorus-containing stabilizers, hindered amine type stabilizers, etc. The proportion of such a stabilizer is less than 5 parts by mass per 100 parts by mass of the polyphenylene ether. In addition, other known additives addable to the polyphenylene ether may be added in an amount of less than 10 parts by mass per 100 parts by mass of the polyphenylene ether.

In the invention, a known compatibilizer for the polyamide and the polyphenylene ether can be added. The main purpose of the employment of the compatibilizer is the improvement of physical properties of a polyamide-polyphenylene ether mixture. The compatibilizer usable in the invention refers to a polyfunctional compound capable of interacting with the polyphenylene ether or the polyamide, or both. This interaction may be either chemical interaction (for example, grafting) or physical interaction (for example, a change in the surface properties of a dispersed phase). In either case, the resulting polyamide-polyphenylene ether mixture shows an improved compatibility.

Examples of the compatibilizer usable in the invention are described in detail in the specification of WO01/81473. All of such known compatibilizers can be used, and they may be used in combination. Of these various compatibilizers, especially suitable examples of the compatibilizer are maleic acid, maleic anhydride and citric acid.

The amount of the compatibilizer in the invention is preferably 0.01 to 10 parts by mass, more preferably 0.1 to 5 parts by mass, most preferably 0.1 to 1 part by mass, per 100 parts by mass of the mixture of the polyamide and the polyphenylene ether.

Although the blending ratio (by mass) of the polyamide to the polyphenylene ether is not particularly limited, it is preferably 30/70 to 80/20, more preferably 40/60 to 75/25, still more preferably 45/55 to 70/30.

As the polyester usable in the invention, there are exemplified thermoplastic polyesters obtained by condensing a dicarboxylic acid or its derivative (e.g. lower alkyl ester, acid halide or acid anhydride) with a glycol or a dihydric phenol.

Specific examples of the dicarboxylic acid suitable for the production of the polyester are aliphatic dicarboxylic acids such as oxalic acid, malonic acid, succinic acid, glutaric acid, adipic acid, suberic acid, azelaic acid, sebacic acid, etc.; aromatic dicarboxylic acids such as terephthalic acid, isophthalic acid, p,p-dicarboxydiphenyl sulfone, p-carboxyphenoxypropionic acid, p-carboxyphenoxyacetic acid, p-carboxyphenoxybutyric acid, p-carboxyphenoxyvaleric acid, 2,6-naphthalenedicarboxylic acid, 2,7-naphthalenedicarboxylic acid, etc.; and mixtures of these carboxylic acids.

Specific examples of the glycol suitable for the production of the polyester are straight-chain alkylene glycols of 2 to 12 carbon atoms, for example, aliphatic glycols such as ethylene glycol, 1,3-propylene glycol, 1,4-butene glycol, 1,6-hexene glycol, 1,12-dodecamethylene glycol, etc; aromatic glycols such as p-xylylene glycol, etc.; and alicyclic glycols such as 1,4-cyclohexanedimethanol, etc. The dihydric phenol includes pyrocatechol, resorcinol, hydroquinone and alkyl-substituted derivatives of these compounds.

Other examples of the polyester are polyesters obtained by ring-opening polymerization of a lactone, such as polypivalolactones, poly($\epsilon$-caprolactone)s, etc. In addition, there can also be used polyesters containing segments of a different kind, such as polyester-polyethers containing, as soft segments, a poly(alkylene glycol) represented by poly(ethylene glycol)s, poly(tetramethylene glycols) and the like.

Still other examples of the polyester are polyesters as polymers that form liquid crystals when they are in a molten state. As polyesters classified into this group, X7G of Eastman Kodak Company, Xyday of Dartco Corporation, Econol of Sumitomo Chemical Co., Ltd., Vectra of Ceranese Corporation and the like are typical commodities.

Of the various polyesters exemplified above, poly(ethylene terephthalate)s (PET), poly(butylene terephthalate)s (PBT), poly(trimethylene terephthalate)s (PTT), poly(naphthalene terephthalate)s (PEN), poly(1,4-cyclohexanedimethylene terephthalate)s (PCT), mesomorphic polyesters, and mixtures thereof are polyesters suitable for the invention. In particular, one or more polyesters selected from the group consisting of poly(ethylene terephthalate)s, poly(butylene terephthalate)s and poly(trimethylene terephthalate)s are more suitable, and poly(butylene terephthalate)s and poly(ethylene terephthalate)s are the most suitable.

For the reduction of the water absorption percentage, i.e., one of the effects of the resin composition of the invention, the above-exemplified polyesters preferably contain no ionic functional group.

The intrinsic viscosity (IV: measured at 20° C. and a concentration of 0.5 g/100 ml in a solution in a phenol/tetrachloroethane (6/4 by mass) mixture) of the polyester usable in the invention is preferably 0.5 to 1.2 dl/g, more preferably 0.6 to 1.0 dl/g, still more preferably 0.6 to 0.9 dl/g. A mixture of two or more polyesters different in intrinsic viscosity may also be used. For preventing the deterioration of the impact properties of the resin composition, the intrinsic viscosity is preferably 0.5 dl/g or more, more preferably 0.6 dl/g or more. For preventing the deterioration of the fluidity of the resin composition, the intrinsic viscosity is preferably 1.2 dl/g or less, more preferably 1.0 dl/g or less.

In addition, as the polyester usable in the invention, polyesters recovered from the market may also be used. In particular, the poly(ethylene terephthalate)s may contain a regenerated one obtained from recovered PET bottles. Employment of the polyesters recovered from the market permits reduction of environmental loads.

The proportion of the polyester in the resin composition of the invention is preferably 0.1 to 25 parts by mass, more preferably 0.1 to 15 parts by mass, still more preferably 1 to 15 parts by mass, most preferably 2.5 to 15 parts by mass, per 100 parts by mass of the sum of the polyamide and the polyphenylene ether. For preventing the deterioration of the Izod impact properties of the resin composition, the proportion of the polyester is preferably 25 parts by mass or less. In addition, for preventing the deterioration of the impact properties of the resin composition in a low temperature range, the proportion is preferably 15 parts by mass or less. For the exhibition of the excellent conductivity of the resin composition, the proportion of the polyester is preferably 0.1 part by mass or more, more preferably 1 part by mass or more. Furthermore, for reducing the water absorption percentage of the resin composition, the proportion is preferably 2.5 parts by mass or more.

Next, the conductive carbon filler usable in the invention is explained below. Specific examples of the conductive carbon filler usable in the invention are conductive carbon black, carbon fibril (referred to also as CNT), carbon fiber and the like.

The conductive carbon black usable in the invention is preferably carbon black having a dibutyl phthalate (DBP) oil absorption of 250 ml/100 g or more, more preferably 300 ml/100 g or more, still more preferably 350 ml/100 g or more. The term "DBP oil absorption" used here means a value measured by the method prescribed in ASTM D2414.

Such conductive carbon black may be used in combination with common carbon black. The conductive carbon black usable in the invention is preferably one having a BET surface area of 200 $cm^2/g$ or more, more preferably 400 $cm^2/g$ or more. Examples of such conductive carbon black on the market are Ketjen Black EC, Ketjen Black EC-600JD and the like of Ketjen Black International Company.

As the carbon fibril usable in the invention, there are exemplified slightly branched carbon fibers having a fiber diameter of less than 75 nm and a hollow structure which are described in U.S. Pat. Nos. 4,663,230, 5,165,909, 5,171,560, 5,578,543, 5,589,152, 5,650,370, 6,235,674 and the like. The carbon fibril includes those having a coil form with a pitch of spiral of 1 μm or less. As such carbon fibril on the market, carbon fibril (BN fibril) available from Hyperion Catalysis International Inc. and the like can be exemplified.

The carbon fiber usable in the invention includes, for example, polyacrylonitrile-based carbon fibers, rayon-based carbon fibers, lignin-based carbon fibers and pitch-based carbon fibers. These may be used alone or in combination.

Needless to say, as the conductive carbon filler used in the invention, the above-exemplified conductive carbon blacks, carbon fibrils, carbon fibers and the like may be used in combination.

As the conductive carbon filler used in the invention, those having an average primary-particle diameter or average fiber diameter of less than 1 μm are preferable. Specific examples of such a conductive carbon filler are the conductive carbon blacks and carbon fibrils among the above-exemplified conductive carbon fillers.

The term "average primary-particle diameter" used herein is applied in the case of a granular conductive carbon filler and means the average of the diameter values of 2,000 or more particles measured by taking a photograph at a magnification of tens of thousands through an electron microscope having a resolving power of at least 1.5 to 2 nm. The term "average fiber diameter" used herein is applied in the case of a fibrous conductive carbon filler and means a value measured under an electron microscope in the same manner as in the case of the average primary-particle diameter.

The amount of the conductive carbon filler added in the invention ranges preferably from 0.1 to 3 parts by mass, more preferably from 0.3 to 3 parts by mass, most preferably from 0.3 to 2 parts by mass, per 100 parts by mass of the sum of the polyamide, the polyphenylene ether and the polyester.

A method for adding the conductive carbon filler is not particularly limited. Examples of the method are a method of directly adding the conductive carbon filler to a mixture of the polyamide, the polyphenylene ether and the polyester and melt-kneading them; and a method of adding the conductive carbon filler in the form of a master batch obtained by previously blending the conductive carbon filler with one or more components selected from the polyester and the polyamide. In particular, the addition of the conductive carbon filler in the form of the master batch is preferable.

As the master batch of conductive carbon black, master batches obtained by previously blending the conductive carbon black with the polyamide, the polyester or a mixture of the polyamide and polyester are preferable.

The amount of the conductive carbon black in such a master batch is preferably 5 to 25% by mass, more preferably 5 to 15% by mass, still more preferably 8 to 12% by mass, when the amount of the master batch is taken as 100% by mass.

The above applies also to the master batch of carbon fibril, that is, master batches obtained by previously blending the carbon fibril with the polyamide, the polyester or a mixture of the polyamide and polyester are preferably usable. In particular, as the master batch obtained by blending the carbon fibril with the polyamide, a polyamide 66/carbon fibril master batch (Polyamide66 with Fibril™ Nanotubes RMB4620-00, a trade name; the amount of carbon fibril 20%) available from Hyperion Catalysis International Inc. is exemplified.

The amount of the carbon fibril in such a master batch is preferably 5 to 25% by mass, more preferably 8 to 25% by mass, still more preferably 10 to 25% by mass, when the amount of the master batch is taken as 100% by mass.

Examples of process for producing the master batch are a process in which using a twin-screw extruder having a feed opening on the upstream side and one or more feed openings on the downstream side, the polyamide and/or the polyester are fed from the upstream side and the conductive carbon filler is fed from the downstream side, followed by melt-kneading; a process in which a portion of the polyamide and/or the polyester is fed from the upstream side and the remaining polyamide and/or polyester and the conductive carbon filler are added from the downstream side, followed by melt-kneading; a process in which the polyamide is added from the upstream side and the polyester and the conductive carbon filler are added from the downstream side, followed by melt-kneading; a process in which the polyester is added from the upstream side and the polyamide and the conductive carbon filler are added from the downstream side, followed by melt-kneading; and a process in which using a twin-screw extruder having a feed opening on the upstream side and two or more feed openings on the downstream side, the polyamide or the polyester is fed from the upstream side, the polyester or the polyamide is fed through the first feed opening on the downstream side (the feed opening on the more upstream side among the two feed openings on the downstream side), and the conductive carbon filler is added through the second feed opening on the downstream side (the feed opening on the more downstream side among the two feed openings on the downstream side), followed by melt-kneading.

Although the preset temperature of a processing machine for producing the master batch is not particularly limited, it ranges preferably from 240 to 350° C., more preferably from 240 to 300° C., still more preferably from 240 to 280° C.

If necessary, the resin composition of the invention may contain an elastomer in an amount of less than 50 parts by mass per 100 parts by mass of the sum of the polyamide, the polyphenylene ether and the polyester. As the elastomer, for example, block copolymers comprising at least one polymer block composed mainly of an aromatic vinyl compound and at least one polymer block composed mainly of a conjugated diene compound can be suitably used.

The words "composed mainly of" in the case of the polymer block composed mainly of an aromatic vinyl compound in the invention are used for expressing that the content of residues of the aromatic vinyl compound in the block is at least 50% by mass, preferably 70% by mass or more, more preferably 80% by mass or more, most preferably 90% by mass or more. The words "composed mainly of" in the case of the polymer block composed mainly of a conjugated diene compound are similarly used for expressing that the content of residues of the conjugated diene compound in the block is at least 50% by mass, preferably 70% by mass or more, more preferably 80% by mass or more, most preferably 90% by mass or more.

In this case, for example, an aromatic vinyl compound block containing a small amount of residues of the conjugated diene compound or other compounds bonded thereto at random is also considered a polymer block composed mainly of the aromatic vinyl compound when 50% by mass of the aromatic vinyl compound block is composed of the aromatic vinyl compound. The above applies also to the block composed mainly of the conjugated diene compound.

Specific examples of the aromatic vinyl compound are styrene, α-methylstyrene, vinyltoluene, etc. One or more compounds selected from them are used and styrene is especially preferable. Specific examples of the conjugated diene compound are butadiene, isoprene, piperylene, 1,3-pentadiene, etc. One or more compounds selected from them are used and butadiene, isoprene and a combination thereof are especially preferable.

As to the microstructure of the conjugated diene compound block portion of the block copolymer, the 1,2-vinyl content or the sum of the 1,2-vinyl content and the 3,4-vinyl content is preferably 5 to 80%, more preferably 10 to 50%, most preferably 15 to 40%.

The block copolymer used in the invention is preferably a block copolymer in which the polymer block [A] composed mainly of an aromatic vinyl compound and the polymer block [B] composed mainly of a conjugated diene compound have a manner of bonding selected from the group consisting of A-B type, A-B-A type and A-B-A-B type. A mixture of these types may also be employed. Of these, A-B type, A-B-A type or a mixture thereof is more preferable and A-B-A type is the most preferable.

The block copolymer of the aromatic vinyl compound and the conjugated diene compound which can be used in the present invention is preferably a hydrogenated block copolymer. The term "hydrogenated block copolymer" means a copolymer obtained by hydrogenating the above-mentioned block copolymer of the aromatic vinyl compound and the conjugated diene compound so that the aliphatic double bonds of the polymer block composed mainly of the conjugated diene compound may be saturated in the range of more than 0% to 100%. The hydrogenation rate of the hydrogenated block copolymer is preferably 80% or more, most preferably 98% or more.

As the block copolymer, a mixture of the non-hydrogenated block copolymer and the hydrogenated block copolymer may be used without any problem.

As the block copolymer of the aromatic vinyl compound and the conjugated diene compound, mixtures of, for example, the following block copolymers may be used within the scope of the gist of the invention: block copolymers different in the manner of bonding, block copolymers different in the kind of the aromatic vinyl compound, block copolymers different in the kind of the conjugated diene compound, block copolymers different in the 1,2-linkage vinyl content or in the 1,2-linkage vinyl content and the 3,4-linkage vinyl content, and block copolymers different in the aromatic vinyl compound component content.

The block copolymer used in the invention is preferably a mixture of a low-molecular weight block copolymer and a high-molecular weight block copolymer, specifically, a mixture of a low-molecular weight block copolymer having a number average molecular weight of less than 120,000 and a high-molecular weight block copolymer having a number average molecular weight of 120,000 or more. The block copolymer is more preferably a mixture of a low-molecular weight block copolymer having a number average molecular weight of less than 120,000 and a high-molecular weight block copolymer having a number average molecular weight of 170,000 or more.

The mass ratio of the low-molecular weight block copolymer to the high-molecular weight block copolymer is preferably 95/5 to 5/95, more preferably 90/10 to 10/90.

The term "number average molecular weight" used herein means a number average molecular weight measured with an ultraviolet spectrodetector [UV-41, mfd. by Showa Denko K.K.] by the use of a gel permeation chromatography measuring apparatus [GPC SYSTEM21, mfd. by Showa Denko K.K.] and expressed in terms of standard polystyrene. The measuring conditions are as follows:

(Measuring Conditions)
Solvent: chloroform
Temperature: 40° C.
Columns: sample side (K-G, K-800RL, K-800R) reference side (K-805×2)
Flow rate: 10 ml/min.
Measuring wavelength: 254 nm
Pressure: 15 to 17 kg/cm$^2$ In the measurement, low-molecular weight components due to the inactivation of a catalyst during polymerization are detected in some cases. In this case, the low-molecular weight components are excluded from the calculation of the molecular weight. Usually, the calculated correct molecular weight distribution (weight average molecular weight/number average molecular weight) ranges from 1.0 to 1.2.

In the invention, the content of the polymer block composed mainly of an aromatic vinyl compound in the low-molecular weight block copolymer is preferably in the range of less than 90% by mass and not less than 55% by mass. As the low-molecular weight block copolymer, a block copolymer having an aromatic vinyl polymer block content in the above range can be used more suitably because its employment permits improvement of the heat resistance.

In addition, as the low-molecular weight block copolymer, there may be used a mixture of a block copolymer containing the polymer block composed mainly of an aromatic vinyl compound in an amount of less than 90% by mass and not less than 55% by mass and a block copolymer containing the polymer block composed mainly of an aromatic vinyl compound in an amount of less than 55% by mass and not less than 20% by mass.

The block copolymer used in the invention may be a partly or wholly modified block copolymer. The term "modified block copolymer" used here means a block copolymer modified with at least one modifying compound having in its molecular structure at least one carbon-carbon double or triple bond and a functional group(s) of at least one kind selected from the group consisting of carboxylic acid groups, acid anhydride groups, amino group, hydroxyl group and glycidyl group.

As the above-mentioned at least one modifying compound having in its molecular structure at least one carbon-carbon double or triple bond and a functional group(s) of at least one kind selected from the group consisting of carboxylic acid groups, acid anhydride groups, amino group, hydroxyl group and glycidyl group, the same modifying compounds as those exemplified above in the case of the modified polyphenylene ether can be used.

As a process for producing the modified block copolymer, there are exemplified (1) a process in which block copolymer is reacted with the modifying compound by melt-kneading in the presence or absence of a free-radical initiator at a temperature in the range of not higher than 250° C. and not lower than the softening point of the block copolymer; (2) a process in which block copolymer is reacted with the modifying compound in a solution in the presence or absence of a free-radical initiator at a temperature not higher than the softening point of the block copolymer; and (3) a process in which block copolymer is reacted with the modifying compound in the presence or absence of a free-radical initiator at a temperature not higher than the softening point of the block copolymer without melting the block copolymer and the modifying compound. Although any of these processes may be adopted, the process (1) is preferable. Furthermore, in the process (1), it is most preferable to carry out the reaction in the presence of a free-radical initiator.

Inorganic fillers may be incorporated into the resin composition of the invention. The inorganic fillers usable in the invention include, for example, wollastonite, talc, kaolin, xonotlite, titanium oxide, potassium titanate, glass fiber, zinc oxide and zinc sulfide. In particular, wollastonite, talc, clay, titanium oxide, glass fiber, zinc oxide and zinc sulfide are preferable. Wollastonite and talc are more preferable. These may be used as a mixture thereof.

The wollastonite usable in the invention is that obtained by purification, grinding and classification of a natural mineral comprising calcium silicate. Artificially synthesized wollastonite can also be used. As to the size of the wollastonite, the wollastonite is preferably that having an average particle diameter of 2 to 9 μm and an aspect ratio of 5 or more, more preferably that having an average particle diameter of 3 to 7 μm and an aspect ratio of 5 or more, still more preferably that having an average particle diameter of 3 to 7 μm and an aspect ratio of 8 or more.

As the wollastonite, there may be used a combination of wollastonite having an average particle diameter of 2 to 9 μm and an aspect ratio of 5 or more and wollastonite having an average particle diameter of 2 to 9 μm and an aspect ratio of less than 5; preferably a combination of wollastonite having an average particle diameter of 3 to 7 μm and an aspect ratio of 5 or more and wollastonite having an average particle diameter of 3 to 7 μm and an aspect ratio of less than 5; more preferably a combination of wollastonite having an average particle diameter of 3 to 7 μm and an aspect ratio of 8 or more and wollastonite having an average particle diameter of 3 to 7 μm and an aspect ratio of less than 5. When such wollastonites different in aspect ratio are used in combination, the proportion of the wollastonite having a lower aspect ratio is preferably 50 parts by mass or less per 100 parts by mass of the sum of the wollastonites used.

In addition, the wollastonite used in the invention is preferably that having a heating loss at 1000° C. of 1.5% by mass or less.

If necessary, such wollastonite may be treated with a surface-treating agent such as a higher fatty acid or its derivative (e.g. its ester or salt) (for example, stearic acid, oleic acid, palmitic acid, magnesium stearate, calcium stearate, aluminum stearate, stearamide or ethyl stearate), or a coupling agent (for example, a silane coupling agent, titanate coupling agent, aluminum coupling agent or zirconium coupling agent). The amount of the surface-treating agent used is preferably 0.05 to 5% by mass based on the mass of the wollastonite.

The proportion of the wollastonite is preferably 2 to 80 parts by mass, more preferably 2 to 70 parts by mass, still more preferably 5 to 60 parts by mass, per 100 parts by mass of the sum of the polyamide, the polyphenylene ether and the polyester.

The talc usable in the invention is that obtained by purification, grinding and classification of a natural mineral comprising magnesium silicate. As to the size of the talc, the talc is preferably that having an average particle diameter of 1 to 20 μm.

If necessary, such talc may be treated with a surface-treating agent such as a higher fatty acid or its derivative (e.g. its ester or salt) (for example, stearic acid, oleic acid, palmitic acid, magnesium stearate, calcium stearate, aluminum stearate, stearamide or ethyl stearate), or a coupling agent (for example, a silane coupling agent, titanate coupling agent, aluminum coupling agent or zirconium coupling agent). The amount of the surface-treating agent used is preferably 0.05 to 5% by mass based on the mass of the talc. The proportion of the talc is preferably 2 to 80 parts by mass, more preferably 2 to 70 parts by mass, still more preferably 5 to 60 parts by mass, per 100 parts by mass of the sum of the polyamide, the polyphenylene ether and the polyester.

The resin composition of the invention may further contain one or more agents selected from compatibilizers for the polyamide and the polyester and compatibilizers for the polyester and the polyphenylene ether.

As the compatibilizers for the polyamide and the polyester, there can be exemplified one or more members selected from the group consisting of phosphonic ester compounds, phosphorous acid metal salts and phosphoric acid metal salts. When a phosphoric acid metal salt among them is used alone, the tone of the resin composition or its stiffness during heating tends to be deteriorated. Therefore, care must be taken.

The phosphonic ester compounds referred to here are represented by the following general formula:

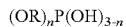

$(OR)_nP(OH)_{3-n}$ wherein R is an alkyl group, a phenyl group or a substituted alkyl or phenyl group formed by the replacement of a portion of the alkyl or phenyl group by a hydrocarbon group or the like; n is 1, 2 or 3; and the (RO) group(s) may be the same or different, specific examples of R being aliphatic groups such as methyl group, ethyl group, n-propyl group, i-propyl group, n-butyl group, i-butyl group, t-butyl group, n-pentyl group, n-hexyl group, n-octyl group, 2-ethylhexyl group, decyl group, lauryl group, tridecyl group, stearyl group, oleyl group, etc.; aromatic groups such as phenyl group, biphenyl group, etc; and substituted aromatic groups having as the substituent a hydroxyl group, methyl group, ethyl group, propyl group, t-butyl group, nonyl group, methoxy group ethoxy group or the like.

Preferable examples of the phosphonic ester compounds are ethyl phosphite, diethyl phosphite, dipropyl phosphite, dibutyl phosphite, diphenyl phosphite, trimethyl phosphite, triethyl phosphite, tripropyl phosphite, tributyl phosphite, trioctyl phosphite, tributoxyethyl phosphite, tris(2-ethylhexyl) phosphite, triphenyl phosphite, diphenylcresyl phosphite, tricresyl phosphite, biphenyl phosphite, tris(2,4-di-t-butylphenyl) phosphite, tris(1,5-di-t-butylphenyl)phosphite, tris(dimethylphenyl)phosphite, tris(isopropylphenyl)phosphite, octyldiphenyl phosphite; and mixtures thereof.

The proportion of the phosphonic ester compound is preferably 0.05 to 10 parts by mass, more preferably 0.1 to 5 parts by mass, most preferably 0.5 to 2.5 parts by mass, per 100 parts by mass of the sum of the polyamide and the polyester.

Next, the phosphorous acid metal salts referred to here are metal salts derived from phosphorous acid or hypophosphorous acid and an element in group 1, 2, 3, 4, 5, 6, 7, 8, 11, 12 or 13 of the periodic table, tin, lead or the like. Needless to say, these phosphorous acid metal salts may be used alone or in combination. Of these, the hypophosphorous acid metal salts are preferable, and sodium hypophosphite ($NaH_2PO_2.H_2O$), calcium hypophosphite ($Ca(H_2PO_2)_2$) or a mixture thereof is the most preferable.

The content of the above-mentioned phosphorous acid metal salt is preferably 0.05 to 10 parts by mass, more preferably 0.1 to 5 parts by mass, most preferably 0.5 to 2.5 parts by mass, per 100 parts by mass of the sum of the polyamide and the polyester.

The state of the presence of each of the above-exemplified compatibilizers in the composition is not particularly limited. For example, the phosphonic ester or the phosphorous acid metal salt may be present as it is or in the form of a phosphoric ester, a phosphoric acid metal salt or a mixture thereof. In addition, the phosphonic ester compound or the phosphorous acid metal salt may be present in the form of a hydrolyzate thereof such as phosphorous acid or phosphoric acid.

As the compatibilizers for the polyester and the polyphenylene ether used in the invention, there can be used all known compatibilizers for the polyphenylene ether and the polyester, for example, compounds having both a carbon-carbon double or triple bond and a functional group(s) reactive with the polyester, such as acrylic acid, methacrylic acid, methylacrylic acid, methylmethacrylic acid, glycidyl acrylate, glycidyl methacrylate, maleic acid, maleic anhydride, fumaric acid, etc.; styrene resins having functional groups reactive with the polyester, such as copolymers of glycidyl methacrylate and a polystyrene, copolymers of acrylic acid and a polystyrene; isocyanate compounds; oxazoline-ring-containing compounds; and triphenyl-phosphine.

The amount of the compatibilizer for the polyphenylene ether and the polyester is preferably 0.1 to 20 parts by mass, more preferably 0.5 to 10 parts by mass, still more preferably 1 to 5 parts by mass, per 100 parts by mass of the sum of the polyphenylene ether and the polyester.

A method for adding the above-mentioned compatibilizer is not particularly limited. Examples thereof are a method of adding the compatibilizer together with the polyester or the conductive carbon filler in the production of a master batch; a method of adding the compatibilizer together with the polyphenylene ether in the production of the resin composition; a method of incorporating the compatibilizer together with a polyester master batch into the resin composition; a method of incorporating the compatibilizer together with the polyamide into the resin composition; and a method in which when other components (e.g. an inorganic filler) are incorporated into the resin composition, the compatibilizer is incorporated thereinto together with the other components.

A thermoplastic styrene resin may be incorporated into the resin composition of the invention in an amount of less than 50 parts by mass per 100 parts by mass of the sum of the polyamide, the polyphenylene ether and the polyester. The thermoplastic styrene resin referred to herein includes homopolystyrenes, rubber-modified polystyrenes (HIPS), styrene-acrylonitrile copolymers (AS resins), styrene-rubber-like polymer-acrylonitrile copolymers (ABS resins) and the like.

A copolymer containing glycidyl methacrylate groups may be further incorporated into the resin composition of the invention. Specific examples thereof are ethylene/glycidyl methacrylate copolymers, ethylene/methyl acrylate/glycidyl methacrylate copolymers, polystyrene/ethylene/glycidyl methacrylate copolymers, etc.

In the invention, besides the components described above, additive components may be added so long as they do not ruin the effects of the invention. Examples of the additive components are given below.

The additive components are known adhesion-improving agents for enhancing the affinity of an inorganic filler for a resin, flame retardants (e.g. halogenated resins, silicone flame retardants, magnesium hydroxide, aluminum hydroxide, organic phosphate compounds, ammonium polyphosphates and red phosphorus), fluorine-containing polymers having drop-preventing effect, plasticizers (e.g. oils, low-molecular weight polyolefins, poly(ethylene glycol)s and fatty acid esters), flame-retarding assistants (e.g. antimony trioxide), antistatic agents, various peroxides, antioxidants, ultraviolet absorbers, light stabilizers, and the like.

Specifically, the total amount of these components added is not more than 100 parts by mass per 100 parts by mass of the sum of the polyamide, the polyphenylene ether and the polyester.

In the resin composition of the invention, it is preferable that the polyamide forms a continuous phase and that the polyphenylene ether and the polyester form a discontinuous phase. The term "discontinuous phase" used here means a phase not forming a continuous phase. The shape of the discontinuous phase may be either spherical or amorphous (rosary-shaped, string-shaped or the like). The contour of the discontinuous phase may be either smooth or uneven. These morphologies can be confirmed under, for example, a transmission microscope. A transmission microscopic image of a typical example is shown in FIG. 1. The resin composition of the invention obtains an excellent surface appearance (surface luster) owing to the formation of the discontinuous phase by the polyester though the reason is not clear.

In the invention, although the conductive carbon filler may be present in any of the phases of the polyamide, the polyphenylene ether and the polyester, the conductive carbon filler is preferably present in the polyester phase and/or the interface between the polyester phase and the polyamide phase even in a small amount. The term "interface between the polyester phase and the polyamide phase" used here means the vicinity of the boundary between the polyamide phase and the polyester phase observed under a transmission electron microscope. The resin composition of the invention is greatly improved in conductivity by the presence of even a small amount of the conductive carbon filler in the polyester phase and/or the interface between the polyester phase and the polyamide phase. The presence of the conductive carbon filler in the polyester phase and/or the interface between the polyester phase and the polyamide phase can be confirmed under a transmission electron microscope. The presence can be confirmed, for example, by cutting a piece out of a pellet or molded article of the resin composition, preparing a very thin slice from the piece by the use of an ultramicrotome, staining the surface of the slice with ruthenium chloride, osmium tetraoxide, phosphotungstic acid or the like, and observing the stained slice under a transmission electron microscope at a magnification of about 50,000.

Specific examples of processing machine for obtaining the resin composition of the invention are a single-screw extruder, twin-screw extruder, roll, kneader, Brabender Plastograph, Banbury mixer, etc. Of these, the twin-screw extruder is preferable. In particular, a twin-screw extruder with a screw diameter of 25 mm or more and a L/D ratio of 30 or more having a feed opening on the upstream side and one or more feed openings on the downstream side is preferable. As such a twin-screw extruder, a twin-screw extruder with a screw diameter of 45 mm or more and a L/D ratio of 30 or more is the most preferable.

In this case, the preset temperature of cylinder of the processing machine is not particularly limited and any cylinder temperature for obtaining a suitable resin composition may be chosen usually in the range of 240 to 360° C.

The resin composition of the invention thus obtained can be molded to obtain molded articles as various parts, by heretofore known various methods such as injection molding.

The resin composition can be suitably used in the various parts, for example, the electronic parts of motorcycles and automobiles represented by relay block materials and the like; IC tray materials; electrical and electronic parts such as the chassis, cabinets and the like of various disc players and the like; office automation appliance parts and machine parts for various computers, peripheral equipments for them, and the like; the cowls of motorcycles; the external trim parts of automobiles represented by bumpers, fenders, door panels, various moles, emblems, outer door handles, door mirror housings, wheel caps, roof rails and stay materials therefore, spoilers, etc.; and internal trim parts of automobiles represented by instrument panel, consol box, trims, etc.

EXAMPLES

The invention is illustrated below in further detail with working examples and comparative examples but the invention is not limited by the description given in the working examples.

(Starting Materials Used)

(1) Polyamide 6,6 (hereinafter abbreviated as PA66)

Leona 1200-011, a trade name, mfd. by Asahi Kasei Chemicals Corporation (2) Poly(ethylene terephthalate)s (hereinafter abbreviated as PET)

(2-1) NEH-2050, a trade name, mfd. by UNITICA LTD. (this polymer is hereinafter abbreviated as PET-1)

Intrinsic viscosity: IV=0.78 (measured at 20° C. and a concentration of 0.5 g/100 ml in a solution in a phenol/tetrachloroethane (6/4 by mass) mixture)

(2-2) MA-1340P, a trade name, mfd. by UNITICA LTD. (this polymer is hereinafter abbreviated as PET-2)

Intrinsic viscosity: IV=0.57 (measured at 20° C. and a concentration of 0.5 g/100 ml in a solution in a phenol/tetrachloroethane (6/4 by mass) mixture)

(2-3) MA-2101M, a trade name, mfd. by UNITICA LTD. (this polymer is hereinafter abbreviated as PET-3)

Intrinsic viscosity: IV=0.64 (measured at 20° C. and a concentration of 0.5 g/100 ml in a solution in a phenol/tetrachloroethane (6/4 by mass) mixture)

(2-4) MA-2103, a trade name, mfd. by UNITICA LTD. (this polymer is hereinafter abbreviated as PET-4)

Intrinsic viscosity: IV=0.68 (measured at 20° C. and a concentration of 0.5 g/100 ml in a solution in a phenol/tetrachloroethane (6/4 by mass) mixture)

(2-5) MA-1344P, a trade name, mfd. by UNITICA LTD. (this polymer is hereinafter abbreviated as PET-5)

Intrinsic viscosity: IV=0.71 (measured at 20° C. and a concentration of 0.5 g/100 ml in a solution in a phenol/tetrachloroethane (6/4 by mass) mixture)

(3) Poly(butylene terephthalate) (hereinafter abbreviated as PBT)

DURANEX 2002, a trade name, mfd. by Polyplastics Co. Ltd.

(4) Polyphenylene ether (hereinafter abbreviated as PPE)

Poly(2,6-dimethyl-1,4-phenylene ether)

Reduced viscosity: 0.52 dl/g (measured at 30° C. and a concentration of 0.5 g/dl in a chloroform solution)

(5) Conductive carbon fillers (5-1) Conductive carbon black (hereinafter abbreviated as KB)

Ketjen Black EC-600JD, a trade name, mfd. by Ketjen Black International Company

DBP oil absorption: 495 ml/100 g (measured according to ASTM D2414)

(5-2) Carbon fibril

Polyamide 66/carbon fibril master batch (hereinafter abbreviated as PA/CNT-MB)

Polyamide66 with Fibril™ Nanotubes RMB4620-00, a trade name: the amount of carbon fibril 20% (mfd. by Hyperion Catalysis International Inc.)

(6) Hydrogenated block copolymer (6-1) KRATON G1651, a trade name, mfd. by Kraton Polymers LLC (this copolymer is hereinafter abbreviated as SEBS-1)

(6-2) TUFTEC H1081, a trade name, mfd. by Asahi Kasei Chemicals Corporation (this copolymer is hereinafter abbreviated as SEBS-2)

(7) Compatibility-imparting agent

Maleic anhydride (mfd. by NOF CORPORATION)

(Evaluation Methods)

Evaluation methods of conductivity (volume resistivity), surface luster, fluidity, Izod impact strength and water absorption properties are described below.

<Volume Resistivity>

Resin composition pellets obtained were molded into dumbbell bars according to the description in ISO294 by the use of a molding machine Toshiba Model IS-80EPN (set at a molten resin temperature of 290° C. and a mold temperature of 90° C.), and the dumbbell bars were allowed to stand in an aluminum moistureproof bag at 23° C. for 48 hours. Cuts were previously made in break places of each of these test pieces in a length of about 70 mm with a cutter knife, after which the test pieces were cooled by immersion in liquid nitrogen for 20 minutes and then broken. After standing at room temperature for 1 hour, silver paste was applied on the break surfaces of each test piece. The test pieces were pre-dried at room temperature for 30 minutes and then dried in a hot-air dryer at 80° C. for 20 minutes. They were allowed to stand in a thermo-hygrostat chamber at 23° C. and 50RH % for 1 hour and cooled to room temperature. Thereafter, the volume resistance between the two break surfaces was measured at an applied voltage of 250V by the use of a digital high resistance/micro ampere meter [R8340A, mfd. by ADVANTEST CORPORATION] and the volume resistivity (Ω·cm) was calculated. The measurement was carried out for five different test pieces and the arithmetic average of the measured values is described in the tables given hereinafter.

<Fluidity (MFR)>

The water content of pellets obtained was adjusted to about 400 ppm and MFR (g/10 min) at 280° C. and a load of 5.0 kg was measured according to ASTM D1238.

<Surface Luster>

A 90×50×2.5 mm flat molded piece was obtained with a molding machine Toshiba Model IS-80EPN (set at a molten resin temperature of 290° C. and a mold temperature of 90° C.). The molding conditions were as follows: injection speed 700 mm/sec, back pressure 40 MPa, injection+hold time 10 seconds, and cooling time 15 seconds. A fluorescent lamp was reflected on the flat molded piece obtained and the vividness of the reflection was visually observed. A molded piece mirroring a clear reflection of the fluorescent lamp was considered a molded piece having surface luster, and a molded piece mirroring a dim reflection of the fluorescent lamp was considered a molded piece having no surface luster.

<Water Absorption Properties>

A 90×50×2.5 mm flat molded piece was immersed in warm water at 40° C. for 750 hours and the difference of the mass before and after the immersion was measured. The water absorption percentage was calculated as follows. The mass measurement was carried out after wiping off drops of water adhering to the surface of the molded piece, with dry cloth.

Water absorption percentage=$\Delta M/Mb \times 100(\%)$ *$\Delta M$: Ma–Mb

Ma: the mass after the immersion in warm water
Mb: the mass before the immersion in warm water <Izod Impact Strength>

Notched Izod impact strength ($kJ/m^2$) at 23° C. was measured according to ISO180/1A.

Examples 1 to 3 and Comparative Examples 1 to 3

Figure 2:
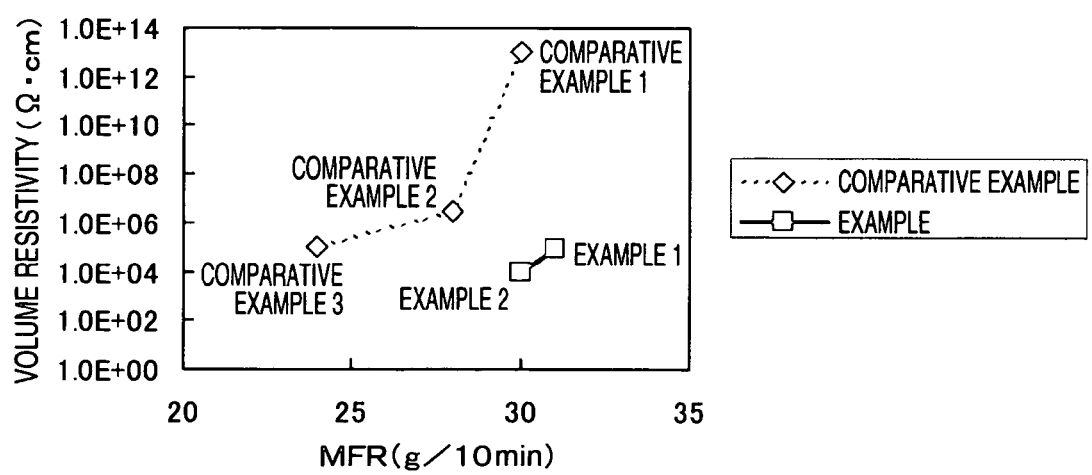
FIG. 2 represents a graph showing the relationship between volume resistivity and MFR in the case of the resin compositions of Examples 1 and 2 and Comparative Examples 1 to 3.

Using a twin-screw extruder [ZSK-25: mfd. by COPERION CORPORATION (Germany)] having an upstream-side feed opening in the first barrel from the upstream side of the extruder and a downstream-side feed opening in the sixth barrel and having a L/D ratio (the length of cylinder of the extruder/the diameter of cylinder of the extruder) of 52 (number of barrels: 13), 90 parts by mass of PA66 and 10 parts by mass of KB were fed through the upstream-side feed opening and the downstream-side feed opening, respectively, and melt-kneaded at a cylinder preset temperature of 270° C., a screw speed of 400 rpm and a discharge rate of 10 kg/h to produce a polyamide/conductive carbon black master batch (hereinafter abbreviated as PA/KB-MB). Using the above-mentioned twin-screw extruder, PPE, a hydrogenated block copolymer and maleic anhydride were fed through the upstream-side feed opening in the proportions described in Table 1 and melt-kneaded at a preset temperature in a region from the upstream-side feed opening to a place just before the downstream-side feed opening of 320° C., a preset temperature in a region from the downstream-side feed opening to a die of 280° C., a screw speed of 300 rpm and a discharge rate of 15 kg/h, and then PA66, PA/KB-MB, PET or PBT were fed through the downstream-side feed opening in the proportions described in Table 1 to produce resin composition pellets. The fluidity (MFR), volume resistivity, surface luster, water absorption properties and Izod impact strength of the resin compositions thus obtained were evaluated. The values of the physical properties are described in Table 1 together with the recipes, and the relationship between volume resistivity and MFR (Examples 1 and 2 and Comparative Examples 1 to 3) are shown in FIG. 2. In addition, the resin composition of Example 2 was observed under a transmission microscope. A microscopic image (ruthenium steam staining and phosphotungstic acid immersion staining) of the resin composition is shown in FIG. 1. It could be confirmed by FIG. 1 that PPE and PET independently form discontinuous phases.

From the results shown in Table 1, it can be seen that the addition of PET or PBT permits great improvement in the conductivity of the resin compositions and imparts an excellent surface luster.

Example 4

Using the same twin-screw extruder as in Example 1, PPE, a hydrogenated block copolymer and maleic anhydride were fed through the upstream-side feed opening in the proportions described in Table 1 and melt-kneaded at a preset temperature in a region from the upstream-side feed opening to a place just before the downstream-side feed opening of 320° C., a preset temperature in a region from the downstream-side feed opening to a die of 280° C., a screw speed of 300 rpm and a discharge rate of 15 kg/h, and then PA66, PET and PA/CNT-MB were fed through the downstream-side feed opening in the proportions described in Table 1 to produce resin composition pellets. The fluidity (MFR), volume resistivity, surface luster, water absorption properties and Izod impact strength of the resin composition obtained were evaluated. The values of the physical properties are described in Table 1 together with the recipe.

Examples 5 to 8

Resin composition pellets were produced in the same manner as in Example 1 except for changing the recipe as described in Table 2. The fluidity (MFR), volume resistivity, surface luster, water absorption properties and Izod impact strength of the resin compositions thus obtained were evaluated. The values of the physical properties are described in Table 2 together with the changed recipes.

Example 9

Resin composition pellets were produced in the same manner as in Example 1 except for changing the recipe as described in Table 3. The fluidity (MFR) and volume resistivity of the resin composition obtained were evaluated. The values of the physical properties are described in Table 3 together with the changed recipe.

Example 10

Using the same twin-screw extruder as in Example 1, 90 parts by mass of PET and 10 parts by mass of KB were fed through the upstream-side feed opening and the downstream-side feed opening, respectively, and melt-kneaded at a preset cylinder temperature of 270° C., a screw speed of 400 rpm and a discharge rate of 10 kg/h to produce a polyester/conductive carbon black master batch (hereinafter abbreviated as PET/KB-MB). Using the above-mentioned twin-screw extruder, PPE, a hydrogenated block copolymer and maleic anhydride were fed through the upstream-side feed opening in the proportions described in Table 3 and melt-kneaded at a preset temperature in a region from the upstream-side feed opening to a place just before the downstream-side feed opening of 320° C., a preset temperature in a region from the downstream-side feed opening to a die of 280° C., a screw speed of 300 rpm and a discharge rate of 15 kg/h, and then PA66, PA/KB-MB and PET/KB-MB were fed through the downstream side feed opening in the proportions described in Table 3 to produce resin composition pellets. The fluidity (MFR) and volume resistivity of the resin composition obtained were evaluated. The values of the physical properties are described in Table 3 together with the recipe.

Example 11

Using the same twin-screw extruder as in Example 1, a combination of 50 parts by mass of PET and 40 parts by mass of PA66, and 10 parts by mass of KB were fed through the upstream-side feed opening and the downstream-side feed opening, respectively, and melt-kneaded at a preset cylinder temperature of 270° C., a screw speed of 400 rpm and a discharge rate of 10 kg/h to produce a polyester/polyamide/conductive carbon black master batch (hereinafter abbreviated as PET/PA/KB-MB). Using the above-mentioned twin-screw extruder, PPE, a hydrogenated block copolymer and maleic anhydride were fed through the upstream-side feed opening in the proportions described in Table 3 and melt-kneaded at a preset temperature in a region from the upstream-side feed opening to a place just before the downstream-side feed opening of 320° C., a preset temperature in a region from the downstream-side feed opening to a die of 280° C., a screw speed of 300 rpm and a discharge rate of 15 kg/h, and then PA66 and PET/PA/KB-MB were fed through the downstream-side feed opening in the proportions described in Table 3 to produce resin composition pellets. The fluidity (MFR) and volume resistivity of the resin composition obtained were evaluated. The values of the physical properties are described in Table 3 together with the recipe.

Examples 12 to 13

Using a twin-screw extruder [ZSK-25: mfd. by COPERION CORPORATION (Germany)] having an upstream-side feed opening in the first barrel from the upstream side of the extruder, a downstream-side first feed opening in the sixth barrel and a downstream-side second feed opening in the ninth barrel and having a L/D ratio (the length of cylinder of the extruder/the diameter of cylinder of the extruder) of 52 (number of barrels: 13), PPE, a hydrogenated block copolymer and maleic anhydride were fed through the upstream-side feed opening in the proportions described in Table 4 and melt-kneaded at a preset temperature in a region from the upstream-side feed opening to a place just before the downstream-side first feed opening of 320° C., a preset temperature in a region from the downstream-side first feed opening to a die of 280° C., a screw speed of 300 rpm and a discharge rate of 15 kg/h, after which PA66 and PET were fed through the downstream-side first feed opening in the proportions described in Table 4 and KB was fed through the downstream-side second feed opening in the proportion described in Table 4 to produce resin composition pellets. The fluidity (MFR) and volume resistivity of the resin compositions thus obtained were evaluated. The values of the physical properties are described in Table 4 together with the recipes.

Examples 14 to 17

Resin composition pellets were produced in the same manner as in Example 1 except for changing the recipe as described in Table 5. The fluidity (MFR) and volume resistivity of the resin compositions thus obtained were evaluated. The values of the physical properties are described in Table 5 together with the changed recipes.

Example 18

Using a twin-screw extruder [TEM58SS: mfd. by Toshiba Machine Co., Ltd.] having an upstream-side feed opening in the first barrel from the upstream side of the extruder and a downstream-side feed opening in the seventh barrel and having a L/D ratio (the length of cylinder of the extruder/the diameter of cylinder of the extruder) of 52 (number of barrels: 13), PPE, a hydrogenated block copolymer and maleic anhydride were fed through the upstream-side feed opening in the proportions described in Table 6 and melt-kneaded at a preset temperature in a region from the upstream-side feed opening to a place just before the downstream-side feed opening of 320° C., a preset temperature in a region from the downstream-side feed opening to a die of 280° C., a screw speed of 500 rpm and a discharge rate of 500 kg/h, and then PA66, PA/KB-MB and PET were fed through the downstream-side feed opening in the proportions described in Table 6 to produce resin composition pellets. The fluidity (MFR), volume resistivity, surface luster, water absorption properties and Izod impact strength of the resin composition obtained were evaluated. The values of the physical properties are described in Table 6 together with the recipe.

[Table 1]

TABLE 1

| Feed portion of extruder | Component | Unit | Example 1 | Comparative Example 1 | Example 2 | Example 3 | Comparative Example 2 | Comparative Example 3 | Example 4 |
|---|---|---|---|---|---|---|---|---|---|
| | | | | | | Recipe | | | |
| Feed opening on upstream side | PPE | Parts by mass | 35 | 35 | 35 | 35 | 35 | 35 | 35 |
| | Maleic anhydride | | 0.3 | 0.3 | 0.3 | 0.3 | 0.3 | 0.3 | 0.3 |
| | SEBS-1 | | 8 | 8 | 8 | 8 | 8 | 8 | 8 |
| | SEBS-2 | | 2 | 2 | 2 | 2 | 2 | 2 | 2 |
| Feed opening on downstream side | PA66 | | 30 | 40 | 28 | 28 | 38 | 36 | 37.5 |
| | PET-1 | | 10 | 0 | 10 | 0 | 0 | 0 | 10 |
| | PBT | | 0 | 0 | 0 | 10 | 0 | 0 | 0 |
| | PA/KB-MB | | 15 | 15 | 17 | 17 | 17 | 19 | 0 |
| | PA/CNT-MB | | 0 | 0 | 0 | 0 | 0 | 0 | 7.5 |
| Amount (parts by mass) of KB or CNT per 100 parts by mass of the sum of PPE, PA and PET(PBT) | | | 1.7 | 1.7 | 1.9 | 1.9 | 1.9 | 2.2 | 1.7 |
| Amount (parts by mass) of PET(PBT) per 100 parts by mass of the sum of PPE and PA | | | 12.7 | 0 | 12.8 | 12.8 | 0 | 0 | 12.7 |
| | | | | | Measurement result | | | | |
| Volume resistivity | | Ω·cm | $9 \times 10^4$ | $1 \times 10^{13}$ | $1 \times 10^4$ | $8 \times 10^3$ | $3 \times 10^6$ | $1 \times 10^5$ | $9 \times 10^4$ |
| MFR | | g/10 min | 31 | 30 | 30 | 35 | 28 | 24 | 28 |
| Surface luster | | — | Yes | No | Yes | Yes | No | No | Yes |
| Water absorption percentage | | % | 3.3 | 4.0 | 3.2 | 3.2 | 4.0 | 4.0 | 3.3 |
| Izod | | kJ/m² | 18.2 | 20.1 | 17.5 | 16.5 | 18.2 | 16.8 | 22.5 |

[Table 2]

TABLE 2

| Feed portion of extruder | Component | Unit | Example 5 | Example 6 | Example 7 | Example 8 |
|---|---|---|---|---|---|---|
| | | | | Recipe | | |
| Feed opening on upstream side | PPE | Parts by mass | 35 | 35 | 35 | 35 |
| | Maleic anhydride | | 0.3 | 0.3 | 0.3 | 0.3 |
| | SEBS-1 | | 8 | 8 | 8 | 8 |
| | SEBS-2 | | 2 | 2 | 2 | 2 |
| Feed opening on downstream side | PA66 | | 35 | 30.5 | 23 | 19 |
| | PET-1 | | 3 | 7.5 | 15 | 19 |
| | PA/KB-MB | | 17 | 17 | 17 | 17 |
| Amount (parts by mass) of KB or CNT per 100 parts by mass of the sum of PPE, PA and PET(PBT) | | | 1.9 | 1.9 | 1.9 | 1.9 |
| Amount (parts by mass) of PET(PBT) per 100 parts by mass of the sum of PPE and PA | | | 3.5 | 9.3 | 20.5 | 27.4 |
| | | Measurement result | | | | |
| Volume resistivity | | $\Omega \cdot cm$ | $7 \times 10^4$ | $4 \times 10^4$ | $4 \times 10^3$ | $1 \times 10^3$ |
| MFR | | g/10 min | 30 | 30 | 25 | 23 |
| Surface luster | | — | — | Yes | Yes | Yes | Yes |
| Water absorption percentage | | % | 3.8 | 3.4 | 2.9 | 2.6 |
| Izod | | kJ/m$^2$ | 21.5 | 18.6 | 17.0 | 13.5 |

[Table 3]

TABLE 3

| Feed portion of extruder | Component | Unit | Example 9 | Example 10 | Example 11 |
|---|---|---|---|---|---|
| | | | | Recipe | |
| Feed opening on upstream side | PPE | Parts by mass | 35 | 35 | 35 |
| | Maleic anhydride | | 0.3 | 0.3 | 0.3 |
| | SEBS-1 | | 8 | 8 | 8 |
| | SEBS-2 | | 2 | 2 | 2 |
| Feed opening on downstream side | PA66 | | 32.5 | 40 | 40 |
| | PET-1 | | 7.5 | 0 | 0 |
| | PA/KB-MB | | 15 | 6.7 | 0 |
| | PET/KB-MB | | 0 | 8.3 | 0 |
| | PET/PA/KB-MB | | 0 | 0 | 15 |
| Amount (parts by mass) of KB per 100 parts by mass of the sum of PPE, PA and PET | | | 1.7 | 1.7 | 1.7 |
| Amount (parts by mass) of PET(PBT) per 100 parts by mass of the sum of PPE and PA | | | 9.3 | 9.2 | 9.3 |
| | | Measurement result | | | |
| Volume resistivity | | $\Omega \cdot cm$ | $9 \times 10^4$ | $7 \times 10^4$ | $7 \times 10^4$ |
| MFR | | g/10 min | 31 | 30 | 30 |

TABLE 4

| Feed portion of extruder | Component | Unit | Example 12 | Example 13 |
|---|---|---|---|---|
| | | | Recipe | |
| Feed opening on upstream side | PPE | Parts by mass | 35 | 35 |
| | Maleic anhydride | | 0.3 | 0.3 |
| | SEBS-1 | | 8 | 8 |
| | SEBS-2 | | 2 | 2 |
| First feed opening on downstream side | PA66 | | 43.5 | 43.3 |
| | PET-1 | | 10 | 10 |
| Second feed opening on downstream side | KB | | 1.5 | 1.7 |
| Amount (parts by mass) of KB per 100 parts by mass of the sum of PPE, PA and PET | | | 1.7 | 1.9 |
| Amount (parts by mass) of PET(PBT) per 100 parts by mass of the sum of PPE and PA | | | 12.7 | 12.8 |
| Measurement result | | | | |
| Volume resistivity | | $\Omega \cdot cm$ | $1 \times 10^5$ | $3 \times 10^4$ |
| MFR | | g/10 min | 30 | 29 |

TABLE 5

| Feed portion of extruder | Component | Unit | Example 14 | Example 15 | Example 16 | Example 17 |
|---|---|---|---|---|---|---|
| | | | Recipe | | | |
| Feed opening on upstream side | PPE | Parts by mass | 35 | 35 | 35 | 35 |
| | Maleic anhydride | | 0.3 | 0.3 | 0.3 | 0.3 |
| | SEBS-1 | | 8 | 8 | 8 | 8 |
| | SEBS-2 | | 2 | 2 | 2 | 2 |
| Feed opening on downstream side | PA66 | | 30 | 30 | 30 | 30 |
| | PET-2 | | 10 | 0 | 0 | 0 |
| | PET-3 | | 0 | 10 | 0 | 0 |
| | PET-4 | | 0 | 0 | 10 | 0 |
| | PET-5 | | 0 | 0 | 0 | 10 |
| | PA/KB-MB | | 15 | 15 | 15 | 15 |
| Amount (parts by mass) of KB or CNT per 100 parts by mass of the sum of PPE, PA and PET(PBT) | | | 1.7 | 1.7 | 1.7 | 1.7 |
| Amount (parts by mass) of PET(PBT) per 100 parts by mass of the sum of PPE and PA | | | 12.7 | 12.7 | 12.7 | 12.7 |
| Measurement result | | | | | | |
| Volume resistivity | | $\Omega \cdot cm$ | $4 \times 10^4$ | $7 \times 10^4$ | $7 \times 10^4$ | $6 \times 10^4$ |
| MFR | | g/10 min | 32 | 31 | 31 | 30 |

TABLE 6

| Feed portion of extruder | Component | Unit | Example 18 Recipe |
|---|---|---|---|
| Feed opening on upstream side | PPE | Parts by mass | 35 |
| | Maleic anhydride | | 0.3 |
| | SEBS-1 | | 8 |
| | SEBS-2 | | 2 |
| Feed opening on downstream side | PA66 | | 30 |
| | PET-1 | | 10 |
| | PA/KB-MB | | 15 |
| Amount (parts by mass) of KB or CNT per 100 parts by mass of the sum of PPE, PA and PET(PBT) | | | 1.7 |
| Amount (parts by mass) of PET(PBT) per 100 parts by mass of the sum of PPE and PA | | | 12.7 |
| Measurement result | | | |
| Volume resistivity | | $\Omega \cdot cm$ | $5 \times 10^4$ |
| MFR | | g/10 min | 32 |
| Surface luster | | — | Yes |
| Water absorption percentage | | % | 3.3 |
| Izod | | kJ/m² | 18.0 |

INDUSTRIAL APPLICABILITY

The conductive resin composition of the invention and a molded article formed from the conductive resin composition can be used in the various fields of electrical and electronic parts, office automation appliance parts, vehicle parts, machine parts and the like. They can be suitably used particularly in the exterior trim parts of automobiles which can be subjected to electrostatic coating, in particular, automobile fenders.

The invention claimed is:

1. A resin composition comprising
(A) a polyamide,
(B) a polyphenylene ether,
(C) poly(ethylene terephthalate) and/or poly(trimethylene terephthalate) and/or poly(butylene terephthalate), which contain no ionic functional group, and
(D) a conductive carbon filler,
wherein the polyamide forms a continuous phase and the polyphenylene ether and the component (C) form a discontinuous phase; and
wherein the component (C) is contained in an amount of 0.1 to 25 parts by mass based on 100 parts by mass of total amount of the polyamide and the polyphenylene ether.

2. The resin composition according to claim 1, wherein the amount of the component (C) is 1 to 15 parts by mass per 100 parts by mass of the sum of the polyamide and the polyphenylene ether.

3. The resin composition according to claim 1, wherein the amount of the conductive carbon filler is 0.1 to 3 parts by mass per 100 parts by mass of the sum of the polyamide, the polyphenylene ether and the component (C).

4. The resin composition according to claim 1, wherein the conductive carbon filler is one or more members selected from the group consisting of conductive carbon black and carbon fibril.

5. The resin composition according to claim 1, wherein at least a portion of the conductive carbon filler is present in the component (C) phase and/or the interface between the component (C) phase and the polyamide phase.

6. The resin composition according to claim 1, which comprises the conductive carbon filler added in the form of a master batch obtained by previously blending the conductive carbon filler with one or more members selected from the group consisting of the component (C) and the polyamide.

7. The resin composition according to claim 1, wherein the polyphenylene ether is selected from the group consisting of poly(2,6-dimethyl-1,4-phenylene ether)s, copolymers of 2,6-dimethylphenol and 2,3,6-trimethylphenol, and mixtures thereof.

8. The resin composition according to claim 1, which further comprises an elastomer.

9. The resin composition according to claim 8, wherein the elastomer is a hydrogenated product of a block copolymer comprising at least one polymer block composed mainly of an aromatic vinyl compound and at least one polymer block composed mainly of a conjugated diene compound.

10. A method for producing the resin composition according to claim 1, comprising:
melt-mixing the polyamide, the polyphenylene ether, and a master batch comprising the conductive carbon filler (D) and the component (C).

11. The method according to claim 10, wherein the master batch further comprises a polyamide.

12. An injection-molded article formed from the resin composition according to claim 1.

* * * * *